(12) United States Patent  
Wilson

(10) Patent No.: US 12,458,838 B2  
(45) Date of Patent: Nov. 4, 2025

(54) MOTOR SKILL TRAINING DEVICE

(71) Applicant: Donna Wilson, Foxboro, MA (US)

(72) Inventor: Donna Wilson, Foxboro, MA (US)

( * ) Notice: Subject to any disclaimer, the term of this patent is extended or adjusted under 35 U.S.C. 154(b) by 834 days.

(21) Appl. No.: 17/550,517

(22) Filed: Dec. 14, 2021

(65) Prior Publication Data

US 2023/0181962 A1 Jun. 15, 2023

(51) Int. Cl.
*A63B 21/00* (2006.01)
*A63B 21/04* (2006.01)
*A63B 21/05* (2006.01)
*A63B 23/16* (2006.01)

(52) U.S. Cl.
CPC ...... *A63B 21/4023* (2015.10); *A63B 21/0407* (2013.01); *A63B 21/05* (2013.01); *A63B 23/16* (2013.01); *A63B 2210/50* (2013.01); *A63B 2225/08* (2013.01); *A63B 2225/15* (2013.01)

(58) Field of Classification Search
CPC . A63B 21/4023; A63B 21/0407; A63B 21/05; A63B 23/16; A63B 2210/50; A63B 2225/08; A63B 2225/15; A63B 2022/0092; A63B 2022/0094; A63B 22/00
USPC .......................................................... 434/247
See application file for complete search history.

(56) References Cited

U.S. PATENT DOCUMENTS

| | | | |
|---|---|---|---|
| 2,077,570 A * | 4/1937 | Lamare | B65D 5/00 493/82 |
| 2,804,202 A * | 8/1957 | Davis | B65D 75/42 40/701 |
| 2,972,820 A | 2/1961 | Cano | |
| 3,427,731 A | 2/1969 | Debolt | |
| 3,715,816 A | 2/1973 | White | |
| 3,927,767 A * | 12/1975 | Sato | B65D 81/022 206/214 |
| 4,457,722 A | 7/1984 | Housand | |
| D312,311 S | 11/1990 | Cotton | |
| D451,958 S | 12/2001 | Walch | |
| 6,702,331 B2 * | 3/2004 | Derraugh | B42D 1/00 281/38 |
| 6,752,427 B1 * | 6/2004 | Wilen | B42D 1/006 281/3.1 |
| D893,621 S | 8/2020 | Yaremchanka | |
| 2005/0076438 A1 | 4/2005 | Laguatan et al. | |
| 2009/0102178 A1 * | 4/2009 | Thompson | A63H 33/38 281/38 |
| 2013/0078602 A1 * | 3/2013 | Lubbers | G09B 19/00 434/257 |

(Continued)

*Primary Examiner* — Peter S Vasat
*Assistant Examiner* — Stephen Alvesteffer
(74) *Attorney, Agent, or Firm* — Wilmer Cutler Pickering Hale and Dorr LLP

(57) ABSTRACT

A motor skill activity book for individuals having poor fine motor skills can be configured to be laid flat in an elongated fashion and to be closed into a compact rectangular prismatic form. Panels of the motor skill activity book can each include a face layer defining a cutout section, a backing layer, and at least one intermediate layer stacked between the face layer and the backing layer. The panels can be coupled via bindings such that the motor skill activity book can be configured between an open state in which the panels can lay flat such that the front face of each of the panels is substantially flush with the front faces of the other of the panels, and a closed state in which the panels stack on top of each other.

20 Claims, 12 Drawing Sheets

(56) References Cited

U.S. PATENT DOCUMENTS

2017/0370119 A1* 12/2017 Powlen .................. E04H 17/16
2022/0001231 A1* 1/2022 Fiducia .............. A63B 21/4037

* cited by examiner

MOTOR SKILL TRAINING DEVICE

TECHNICAL FIELD

The present disclosure relates to manual dexterity aids or entertainment devices, and more particularly to panels having fine motor skills activities and exercises.

Various objectives, features, and advantages of the disclosed subject matter can be more fully appreciated with reference to the following detailed description of the disclosed subject matter when considered in connection with the following drawings, in which like reference numerals identify like elements.

BACKGROUND

Fine motor skills relate to a person's ability to manipulate objects with small muscles in their fingers, hands, and wrists. For example, motor skills are involved when typing on a keyboard, holding a pen or pencil, using scissors and other tools, putting on clothing, tying shoelaces, or brushing your teeth. These fine motor skills require hand-eye coordination and are developed and improved with a person's age during childhood and young adulthood.

There are general milestones in the development of a typical person's fine motor skill, such as the ability to tie shoes or zip a zipper, that progress with the person's age. People's fine motor skills develop at different paces, so some people may have healthy and adequate fine motor skills even if they don't reach each milestone at the same time as their peers. However, some people may have significant delays in reaching these milestones, which indicates poor fine motor function. Such poor fine motor function can make accomplishing typical daily tasks challenging. The causes of poor fine motor function are not always clear, but can include, for example, muscular issues and dyspraxia, a developmental coordination disorder. Such causes may arise from birth, may develop naturally as one ages, or result from injuries.

Treatments for poor fine motor function are case-dependent and may include a variety of methods. Occupational therapists and physical therapists may work with a person on fine motor techniques and therapies. Other specialists may become involved, including, for example pediatric neurologists, depending on the root cause. Training devices may also be used to improve fine motor function, but can be expensive, unwieldy, or require purchase of multiple disparate devices.

SUMMARY

Some embodiments of the present disclosure provide a motor skill activity book for individuals having poor fine motor skills which can be configured to be laid flat in an elongated fashion and to be closed into a compact rectangular prismatic form. In some embodiments, the motor skill activity book can include a plurality of panels including a first panel, a second panel, a third panel, and a fourth panel, each of the plurality of panels including a face layer defining a cutout section, a backing layer, and at least one intermediate layer stacked between the face layer and the backing layer wherein a front face of the face layer forms at least a portion of a front face of the panel, a rear face of the backing layer forms at least a portion of a rear face of the panel located opposite the front face of the panel, a first coupling edge including at least one edge of the face layer, the at least one intermediate layer, and the backing layer, and a second coupling edge located opposite the first coupling edge including at least one edge of the face layer, the at least one intermediate layer, or the backing layer; at least one motor skill mechanism for stimulating an individual's fine motor skills on the front face of each of the plurality of panels, the at least one motor skill mechanism positioned at least partially within a cavity defined by the cutout section of the face layer of each of the plurality of panels; at least one erasable board disposed on at least one rear face of the plurality of panels; front bindings located on front faces of the plurality of panels, the front bindings coupling the second coupling edge of the first panel to the first coupling edge of the second panel, the second coupling edge of the second panel to the first coupling edge of the third panel, and the second coupling edge of the third panel to the first coupling edge of the fourth panel; and rear bindings located on rear faces of the plurality of panels, the rear bindings coupling the second coupling edge of the first panel to the first coupling edge of the second panel, and the second coupling edge of the third panel to the first coupling edge of the fourth panel, such that the motor skill book can be configured between an open state in which the plurality of panels can lay flat such that the front face of each of the plurality of panels is substantially flush with the front faces of the other of the plurality panels, and a closed state in which the plurality of panels stack on top of each other.

In some embodiments, at least one of the motor skill mechanisms includes a squeeze exercise on one of the plurality of panels, the squeeze exercise including a pouch having edges disposed between a first intermediate layer of the at least one intermediate layer on the one of the plurality of panels and a second intermediate layer of the at least one intermediate layer on the one of the plurality of panels, wherein the first intermediate layer and the second intermediate layer further define a cutout section; and a malleable substance enclosed by the pouch, edges of the cutout sections of the first intermediate layer and the second intermediate layer, and the backing layer of the one of the plurality of panels, wherein the malleable substance can lay substantially flush with the front face of the panel when the malleable substance is compressed such that the motor skill activity book can lay substantially flat on a surface when the front face of the panel is facing the surface.

In some embodiments, the at least one intermediate layer of one of the plurality of panels includes a first intermediate layer and a second intermediate layer, the first intermediate layer and the second intermediate layer defining a cutout section, the first intermediate layer further having at least one notch in a periphery of the first intermediate layer; and the at least one of the motor skill mechanisms includes a tension exercise on the one of the plurality of panels, the tension exercise including at least one tension band mounted to the at least one notch in the periphery of the first intermediate layer, the at least one tension band stretching across the cutout section of the first intermediate layer and the cutout section of the second intermediate layer.

In some embodiments, at least one of the motor skill mechanisms includes a zip exercise on one of the plurality of panels, the zip exercise including a fabric attached to the at least one intermediate layer; and at least one zipper attached to the fabric.

In some embodiments, at least one of the motor skill mechanisms includes a tie exercise on one of the plurality of panels, the tie exercise including at least one string attached to the at least one intermediate layer, the at least one string having ends located on the front face of the one of the plurality of panels.

In some embodiments, at least one of the motor skill mechanisms includes a button exercise on one of the plurality of panels, the button exercise including a fabric attached to the at least one intermediate layer; and at least one button disposed on the at least one intermediate layer, the at least one button located over a slit in the fabric and substantially flush with the front face of the one of the plurality of panels.

In some embodiments, at least one of the motor skill mechanisms includes a writing implement holder on one of the plurality of panels, the writing implement holder including at least one elastic loop on the at least one intermediate layer that can hold a writing implement substantially flush with the front face of the one of the plurality of panels such that the motor skill activity book can lay substantially flat on a surface when the front face of the one of the plurality of panel is facing the surface.

In some embodiments, at least one of the plurality of panels has a QR code etched into the rear face of the backing layer.

Some embodiments of the present disclosure provide a method of making a motor skill activity book for individuals having poor fine motor skills which can be configured to be laid flat in an elongated fashion and to be closed into a compact rectangular prismatic form and including a plurality of panels each having a face layer, at least one intermediate layer, and a backing layer. In some embodiments, the method of making the motor skill activity book can include for each panel of the plurality of panels coupling a rear side of a respective face layer to at least one intermediate layer; coupling the at least one intermediate layer to a front side of a respective backing layer; coupling a motor skill mechanism to a front side of each of the plurality of panels within a cutout section of the respective face layer of each of the plurality of panels; disposing a markable panel on at least one rear side of the plurality of panels; and coupling the plurality of panels such that the motor skill activity book can be reconfigured between an open state in which the plurality of panels can lay flat such that the front side of each of the plurality of panels is substantially flush with the front side of the other of the plurality panels, and a closed state in which the plurality of panels stack on top of each other.

In some embodiments, coupling the plurality of panels includes providing a first group of bindings; providing a second group of bindings; disposing the first group of bindings on face layers of the plurality of panels to couple a second edge of a first panel to a first edge of a second panel, a second edge of the second panel to a first edge of a third panel, and a second edge of the third panel to a first edge of a fourth panel, wherein respective first edges and second edges of each panel are located opposite each other; and disposing the second set of bindings on rear faces of the plurality of panels to couple the second edge of the first panel to the first edge of the second panel, and the second edge of the third panel to the first edge of the fourth panel.

In some embodiments, coupling a motor skill mechanism includes providing a squeeze exercise on one of the plurality of panels, the squeeze exercise including a pouch having edges disposed between a first intermediate layer of the at least one intermediate layer on the one of the plurality of panels and a second intermediate layer of the at least one intermediate layer on the one of the plurality of panels, wherein the first intermediate layer and the second intermediate layer define a cutout section; and a malleable substance enclosed by the pouch, edges of the cutout sections of the first intermediate layer and the second intermediate layer, and the backing layer of the one of the plurality of panels, wherein the malleable substance can lay substantially flush with the front side of the panel when the malleable substance is compressed such that the motor skill activity book can lay substantially flat on a surface when the front face of the panel is facing the surface.

In some embodiments, the at least one intermediate layer of one of the plurality of panels includes a first intermediate layer and a second intermediate layer, the first intermediate layer and the second intermediate layer defining a cutout section, the first intermediate layer further having at least one notch in a periphery of the first intermediate layer; and coupling a motor skill mechanism includes providing a tension exercise on the one of the plurality of panels, the tension exercise including at least one tension band mounted to the at least one notch in the periphery of the first intermediate layer, the at least one tension band stretching across the cutout section of the first intermediate layer and the cutout section of the second intermediate layer.

In some embodiments, coupling a motor skill mechanism includes providing a zip exercise on one of the plurality of panels, the zip exercise including a fabric attached to the at least one intermediate layer; and at least one zipper attached to the fabric.

In some embodiments, coupling a motor skill mechanism includes providing a tie exercise on one of the plurality of panels, the tie exercise including at least one string attached to the at least one intermediate layer, the at least one string having ends located on the front side of the one of the plurality of panels.

In some embodiments, coupling a motor skill mechanism includes providing a button exercise on one of the plurality of panels, the button exercise including a fabric attached to the at least one intermediate layer; and at least one button disposed on the at least one intermediate layer, the at least one button located over a slit in the fabric and substantially flush with the front face of the one of the plurality of panels.

In some embodiments, coupling a motor skill mechanism includes providing a writing implement holder on one of the plurality of panels, the writing implement holder including at least one elastic loop on the at least one intermediate layer that can hold a writing implement substantially flush with the front face of the panel such that the motor skill activity book can lay substantially flat on a surface when the front face of the panel is facing the surface.

In some embodiments, a QR code is etched into a backing layer of at least one of the plurality of panels.

Some embodiments of the present disclosure provide a method of using a motor skill activity book, the motor skill activity book including a plurality of panels, the plurality of panels including at least one motor skill mechanism on a front face of each of the plurality of panels, at least one markable panel disposed on at least one rear face of the plurality of panels, a QR code etched into at least one rear face of the plurality of panels, and a plurality of bindings coupling the plurality of panels, wherein the motor skill activity book can be reconfigured between an open state in which the plurality of panels can lay flat such that the front face of each of the plurality of panels is substantially flush with the front faces of the other of the plurality panels, and a closed state in which the plurality of panels stack on top of each other. In some embodiments, the method can include placing the motor skill activity book on a substantially flat surface; opening the motor skill activity book such that the front face of each panel are substantially flush and the plurality of panels lay on the substantially flat surface; interacting with the at least one motor skill mechanism; and closing the motor skill activity book such that the plurality of panels are stacked on top of each other.

In some embodiments, the method of using the motor skill activity book includes interacting with the at least one motor skill mechanism at a first time; determining a first performance parameter corresponding to the interacting with the at least one motor skill mechanism at the first time; interacting with the at least one motor skill mechanism at a second time, the second time being subsequent to the first time; determining a second performance parameter corresponding to the interacting with the at least one motor skill mechanism at the second time; and comparing the first performance parameter and second performance parameter.

In some embodiments, the method of using the motor skill activity book includes including scanning the QR code with a camera to receive information regarding how to compare the first performance parameter and the second performance parameter.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

It is to be understood that the phraseology and terminology employed herein are for the purpose of description and should not be regarded as limiting. In some embodiments, like reference numbers indicate like elements.

In some embodiments, the disclosure provides a motor skill device having two or more motor skill panels, each motor skill panel having one or more mechanisms for developing at least one fine motor skill. In some embodiments, the motor skill panels can be provided in a compact and foldable form. In some embodiments, the motor skill panels can have a closed state, where the motor skill panels are compact for transport and storage, and an expanded state, which allows some or all of the motor skill panels to lay flat on a flat surface. In some embodiments, the expanded state is provided for with one or more bindings that couple each of the motor skill panels. In some embodiments, the motor skill device can be used to train motor skills. The motor skill device can also be used, according to some embodiments, as a benchmarking tool to measure a user's motor skill development.

Figure 1:
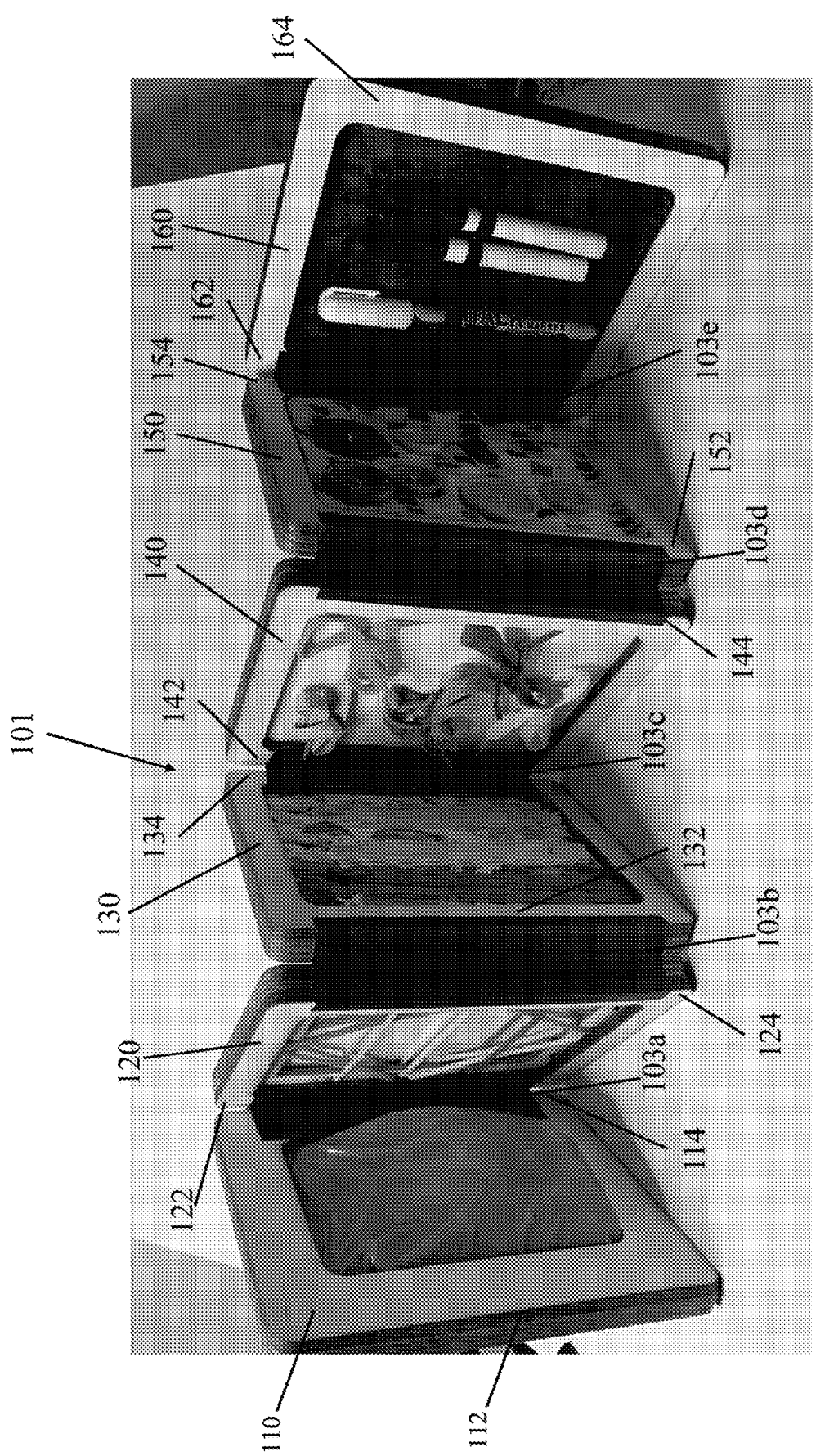
FIG. 1 is a perspective view showing a motor skill device, according to some embodiments.

FIG. 1 shows a perspective view of a motor skill device 101, according to some embodiments. Training device 101 can include a plurality of motor skill panels, such as a first motor skill panel 110, a second motor skill panel 120, a third motor skill panel 130, a fourth motor skill panel 140, a fifth motor skill panel 150, and a sixth motor skill panel 160. Each motor skill panel can provide one or more mechanisms for fine motor training. For example, in some embodiments, the first motor skill panel 110 can be a squeeze panel, the second motor skill panel 120 can be a pull panel, the third motor skill panel 130 can be a zipper panel, the fourth motor skill panel 140 can be a tie panel, the fifth motor skill panel 150 can be a button panel, and the sixth motor skill panel 160 can be a writing implement panel. Certain panels of motor skill panels 110, 120, 130, 140, 150, and 160 can be coupled to others of motor skill panels 110, 120, 130, 140, 150, and 160. Such coupling can be provided by a binding or other coupling devices. For example, as described in more detail throughout embodiments of the present disclosure, the first motor skill panel 110 and the second motor skill panel 120 are coupled together by a binding 103a, the second motor skill panel 120 and the third motor skill panel 130 are coupled together by a binding 103b, the third motor skill panel 130 and the fourth motor skill panel 140 are coupled together by a binding 103c, the fourth motor skill panel 140 and the fifth motor skill panel 150 are coupled together by a binding 103d, and the fifth motor skill panel 150 and the sixth motor skill panel 160 are coupled together by a binding 103e. The bindings 103a, 103b, 103c, 103d, 103e can be adhesive strips. In other embodiments, the bindings 103a, 103b, 103c, 103d, 103e can be hinges, string, rings, book binding tape, or any other structure suitable for coupling the plurality of panels.

A person of skill in the art would understand from the present disclosure that the motor skill device 101 can include a more or fewer panels than shown in FIG. 1 and that the motor skill device 101 can include the same, additional, or alternative mechanisms on the panels.

According to some embodiments, the motor skill panels can be coupled to each other in various ways to enable the user to use the motor skill device 101 in a collapsed state, expanded state, or partially expanded state. In some embodiments, motor skill device 101 can be configured such that the plurality of motor skill panels 110, 120, 130, 140, 150, 160 can be closed and opened in an accordion-like manner. For example, each motor skill panel 110, 120, 130, 140, 150, 160 has a first edge 112, 122, 132, 142, 152, 162, respectively, and a second edge 114, 124, 134, 144, 154, 164, respectively, opposite the first edge and to which bindings can attach. For example, binding 103a couples the second edge 114 of the first motor skill panel 110 with the first edge 122 of the second motor skill panel 120, binding 103b couples the second edge 124 of the second motor skill panel 120 with the first edge 132 of the third motor skill panel 130, binding 103c couples the second edge 134 of the third motor skill panel 130 with the first edge 142 of the fourth motor skill panel 140, binding 103*d* couples the second edge 144 of the fourth motor skill panel 140 with the first edge 152 of the fifth motor skill panel, and binding 103*e* couples the second edge of the fifth motor skill panel 154 with the first edge 162 of the sixth motor skill panel. In some embodiments, binding of the motor skill panels at the respective edges allows the motor skill device 101 to lay flat on a surface, such as a table. In such a flat configuration, all the motor skill panels can be accessed at once while the mechanisms on each motor skill panel face up towards the user. The binding technique can also be useful, for example, to allow the person to select some motor skill panels for use while keeping other motor skill panels in a closed state.

In some embodiments, the plurality of motor skill panels 110, 120, 130, 140, 150, 160 can be bound together by a binding along a common edge in a book-like manner. For example, an adhesive strip can bind all the motor skill panels together. In some embodiments, a clasp (not shown) can be located on the first edge of the first motor skill panel 110 to couple with the sixth motor skill panel 160 to hold the motor skill device 101 shut in a closed configuration. In some embodiments, a first end of a strip of hook-and-loop faster material can be coupled to the first motor skill panel 110 and can be wrapped around the motor skill device 101 to be coupled to the sixth motor skill panel 160 by a second end of the strip of hook-and-loop fastener material to hold the motor skill device 101 shut in the closed configuration. In some embodiments, each of the plurality of motor skill panels 110, 120, 130, 140, 150, 160 can have coupled thereon a hook-and-loop fastener portion to hold the motor skill device 101 shut in the closed configuration. In some embodiments, each of the plurality of motor skill panels 110, 120, 130, 140, 150, 160 can have coupled thereon a magnetic portion to hold the motor skill device 101 shut in the closed configuration. In some embodiments, a ring-based binding system can be used to bind the plurality of motor skill panels 110, 120, 130, 140, 150, 160 using one or more rings that pass through holes near edges of the motor skill panels.

In some embodiments, each of the motor skill panels 110, 120, 130, 140, 150, 160 have a structure that provides structural support. For example, in some embodiments, a frame (described in more detail with reference to FIGS. 6-11) can provide structural support. The frames can be made of a material that provides such structural support. For example, in some embodiments, the frames can be made, at least in part, of one or more materials including, but not limited to wood, plastic, metal (such as aluminum), or another suitable material, such as one that is easy to work with and handle, is durable, provides structure, is readily available, and/or is not cold or hot to the touch. In some embodiments, each of the frames of the motor skill panels 110, 120, 130, 140, 150, 160 are made of the same material. In some embodiments, the frames of the motor skill panels 110, 120, 130, 140, 150, 160 can be made of different materials. For example, the frame of the first motor skill panel 110 and the frame of the sixth motor skill panel 160 can be made of denser material than the frame of the second motor skill panel 120, third motor skill panel 130, fourth motor skill panel 140, and fifth motor skill panel 150. In some embodiments, such a material selection can help the motor skill device sit flat when in a closed configuration by providing heavier outer motor skill panels without adding more weight to the device.

The following discussion of exercises and mechanisms on various motor skill panels is included to provide examples of fine motor skill panels. A person of skill in the art would understand from the present disclosure that other exercises and mechanisms are contemplated without departing from the spirit and scope of the disclosed embodiments of the disclosure.

Figure 2:
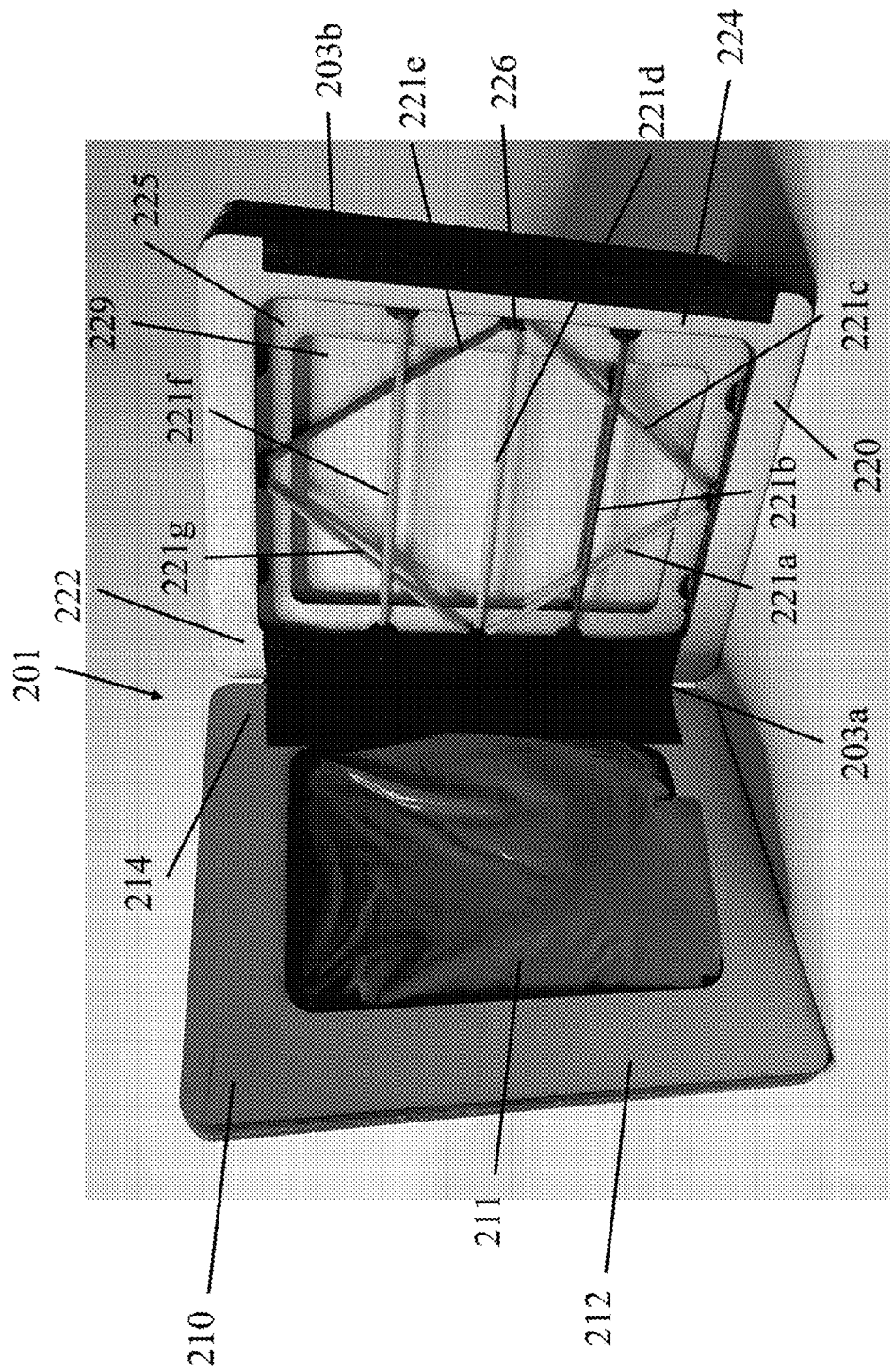
FIG. 2 is a perspective view of motor skill panels of a motor skill device, according to some embodiments.

FIG. 2 shows a perspective view of first motor skill panel 210 and second motor skill panel 220, according to some embodiments. In some embodiments, binding 203*a* couples second edge 214 of first motor skill panel 210 to first edge 222 of second motor skill panel 220 and binding 203*b* couples second edge 224 of second motor skill panel 220 to first edge of third motor skill panel.

In some embodiments, a squeeze element 211 can be disposed on the first motor skill panel 210. In some embodiments, the squeeze element 211 can be a pouch filled with a malleable substance. In some embodiments, squeeze element 211 can be formed by placing a sheet of malleable material over the malleable substance disposed on first motor skill panel 210. For example, without limitation, the squeeze element 211 can be filled with a finely-grained particulate (e.g., sand), gel, putty, or a liquid and the pouch or sheet of malleable material can be made of material selected to withstand extensive use without leaking. In some embodiments, the first motor skill panel 210 can have multiple squeeze elements 211. In some embodiments having multiple squeeze elements 211, each squeeze element 211 can be filled with a different substance or same substance and can have the same and/or different sizes and shapes. In some embodiments, small squeeze element can be used for fine motor skills involving one or two fingers, while larger squeeze elements can be used for fine motor skills involving two or more fingers.

Figure 6:
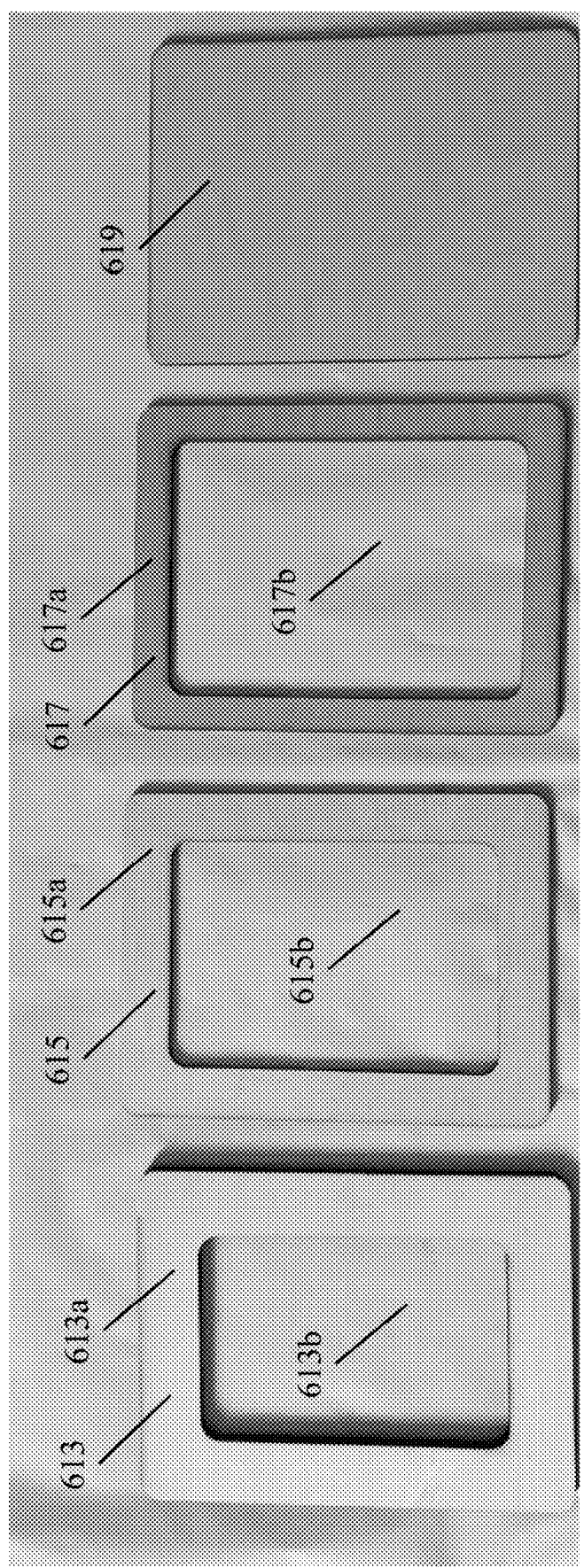
FIG. 6 is a deconstructed view showing pieces of a motor skill panel for squeezing exercises, according to some embodiments.

FIG. 6 shows a perspective view of the frame of the first motor skill panel 210 according to some embodiments. The frame of first motor skill panel 210 can include a face layer 613, a mounting layer 615, a spacer layer 617, and a backing layer 619. In some embodiments, each of layer 613, 615, 617, and 619 are stacked and coupled to each adjacent layer. For example, face layer 613 can be a topmost layer, mounting layer 615 can be coupled to and sandwiched between face layer 613 and spacer layer 617, and backing layer 619 can be coupled to spacer layer 617. In some embodiments, the layers 613, 615, 617, and 619 can be coupled with an adhesive. In some embodiments, the layers 613, 615, 617, and 619 can be coupled with a fastener, such as a nail or screw. Other suitable couplings are contemplated.

In some embodiments, the face layer 613 provides a surface for a user to grasp and can include a border 613*a* defining a cutout 613*b*. In some embodiments, the cutout 613*b* can be the same shape as the outer edge of the border 613*a* or the cutout 613*b* can be a different shape from the outer edge of the border 613*a*. Similarly, mounting layer 615 and spacer layer 617 can include a border 615*a*, 617*a* and cutout 615*b*, 617*b* respectively. In some embodiments, backing layer 619 is a solid piece to provide a surface for squeeze element 211 to rest on.

In some embodiments, the arrangement of face layer 613, mounting layer 615, spacer layer 617, and backing layer 619 facilitates maintenance of squeeze element 211 on the first motor skill panel 210. For example, edges of a malleable material forming squeeze element 211 can be sandwiched between mounting layer 615 and spacer layer 617 to hold squeeze element 211 in place on the first motor skill panel 210. In some embodiments, squeeze element 211 can be disposed within a recess formed by cutouts 613*b*, 615*b*, 617*b* to prevent the squeeze element 211 from impeding closure of the first motor skill panel 210 and second motor skill panel 220. In some embodiments, squeeze element 211 can contain an amount of malleable substance such that squeeze element fills space in cutout 229 of second motor skill panel 220 when first motor skill panel 210 and second motor skill panel 220 are in a closed configuration.

Referring again to FIG. 2, in some embodiments, one or more tension elements 221a, 221b, 221c, 221d, 221e, 221f, 221g can be disposed on the second motor skill panel 220. A person of ordinary skill in the art would understand from the present disclosure that the tension elements provide elastic resistance proportional to an amount of force required to elongate the tension element. For example, more force is required to expand a tension element with a large elastic resistance than another tension element having a small elastic resistance. In some embodiments, the tension elements can have the same elastic resistance. In some embodiments, one or more tension elements on motor skill panel 220 can have different elastic resistance than other tension elements to provide various levels of resistances. This can provide for more options during use. For example, if one or more of a user's fingers is stronger than others, the stronger finger(s) may require larger elastic resistance for effective motor skill training. Likewise, weaker fingers may require less elastic resistance than other fingers for effective motor skill training. By providing tension elements having varied resistance, the user can train motor skills for each finger using the same motor skill device 201. In some embodiments, elastic resistance can be varied depending on material selection of the tension elements, lengths of the tension elements, or diameters of the tension elements. The tension elements can be made, for example and without limitation, of rubber, plastic, fabric, or any other material suitable for providing tension when elongated. According to some embodiments, the tension elements can be configured in any arrangement with more or fewer tension elements than shown in FIG. 2 and/or arranged in various patterns. For example, in some embodiments, tension elements 221b, 221d, and 221f can be arranged parallel to each other and/or superimposed over a diamond shape formed by the configuration of tension elements 221a, 221b, 221e, and 221g. In some embodiments, tension elements 221a, 221b, 221c, 221d, 221e, 221f, and 221g can be arranged in a configuration such that one or more tension element crosses over another tension element to provide additional resistance.

In some embodiments, the tension elements can be disposed in a recessed cutout 229 formed by the frame of the second motor skill device 201 to facilitate closure of first motor skill panel 210 and second motor skill panel 220.

Figure 7:
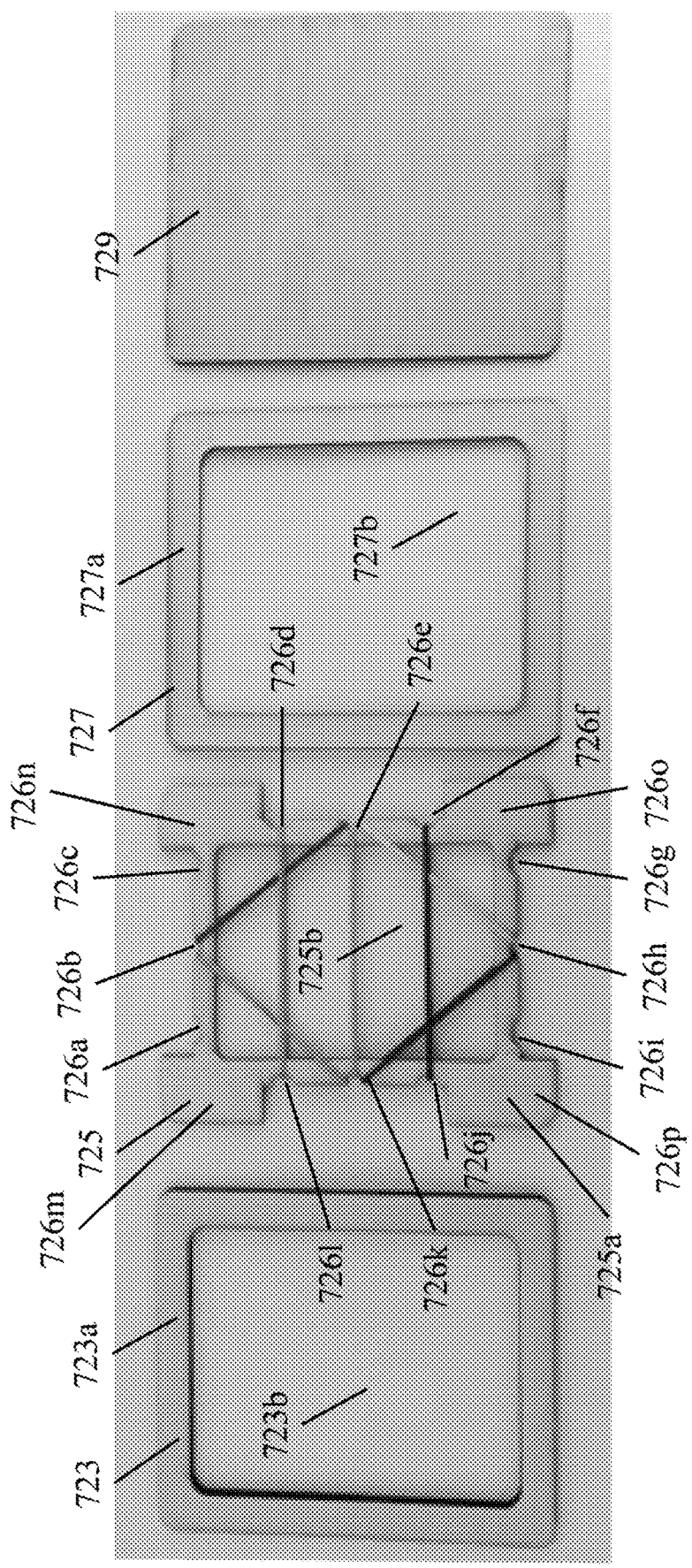
FIG. 7 is a deconstructed view showing pieces of a motor skill panel for tension element exercises, according to some embodiments.

FIG. 7 shows a perspective view of the frame of the second motor skill panel 220, shown in FIG. 2, according to some embodiments. The frame of second motor skill panel 220 can include a face layer 723, a mounting layer 725, a spacer layer 727, and a backing layer 729. In some embodiments, each of layer 723, 725, 727, and 729 are stacked and coupled to each adjacent layer. For example, face layer 723 can be a topmost layer, mounting layer 725 can be coupled to and sandwiched between face layer 723 and spacer layer 727, and backing layer 729 can be coupled to spacer layer 727. In some embodiments, the layers 723, 725, 727, and 729 can be coupled with an adhesive. In some embodiments, the layers 723, 725, 727, and 729 can be coupled with a fastener, such as a nail or screw. Other suitable couplings are contemplated.

In some embodiments, the face layer 723 provides a surface for the user to grasp and can include a border 723a defining a cutout 723b. The face layer 723 further serves to retain the mounting layer 725 and provide a buffer from the surface of the panel to the tension elements. In some embodiments, the cutout 723b can be the same shape as the outer edge of the border 723a or the cutout 723b can be a different shape from the outer edge of the border 723a.

In some embodiments, the mounting layer 725 provides a structure for placement of tension elements. For example, mounting layer 725 can have a border 725a surrounding a cutout 725b and notches 726a-726l in the border 725a. The notches provide a channel through which the tension elements can be guided through or to which tension elements can be secured. For example, tension elements can be loops of material that stretch across cutout 725b and wrap around border 725a edges. In some embodiments, the tension elements can be strips of material that are secured to the surface of border 725a. For example, the tension elements can be secured to the border 725a with adhesive, or a fastener such as a nail, screw, or staple. In some embodiments, the notches 726a-726l, optionally in combination with face layer 723 and spacer layer 727 are sufficient to retain the tension elements. In some embodiments, the mounting layer 725 is sized to mount the tension elements within the opening 723b of the face layer 723. In such embodiments, the mounting layer can include one or more lobes 726m-726p that are sandwiched between the face layer 723 and the spacing layer 727.

In some embodiments, the spacer layer 727 can provide a border 727a around a cutout 727b. In some embodiments, the cutout 727b can be the same shape as the border 727a or the cutout 727b can be a different shape than the border 727a In some embodiments, backing layer 729 is a solid piece without a cutout. In some embodiments, the backing layer 729 being a solid piece provides a surface for a mechanism having a generally flat form, as discussed with reference to FIG. 5.

In some embodiments, the arrangement of face layer 723, mounting layer 725, spacer layer 727, and backing layer 729 is useful to suspend the tension elements between face layer 723 and spacer layer 727 within the frame of second motor skill panel 220 in a floating configuration. In some embodiments, the thickness of spacer layer 727 separates the tension elements from the backing layer 729 to create space for a user's finger to be able to fit under a tension element to pull the tension element away from the spacer layer 727.

Figure 3:
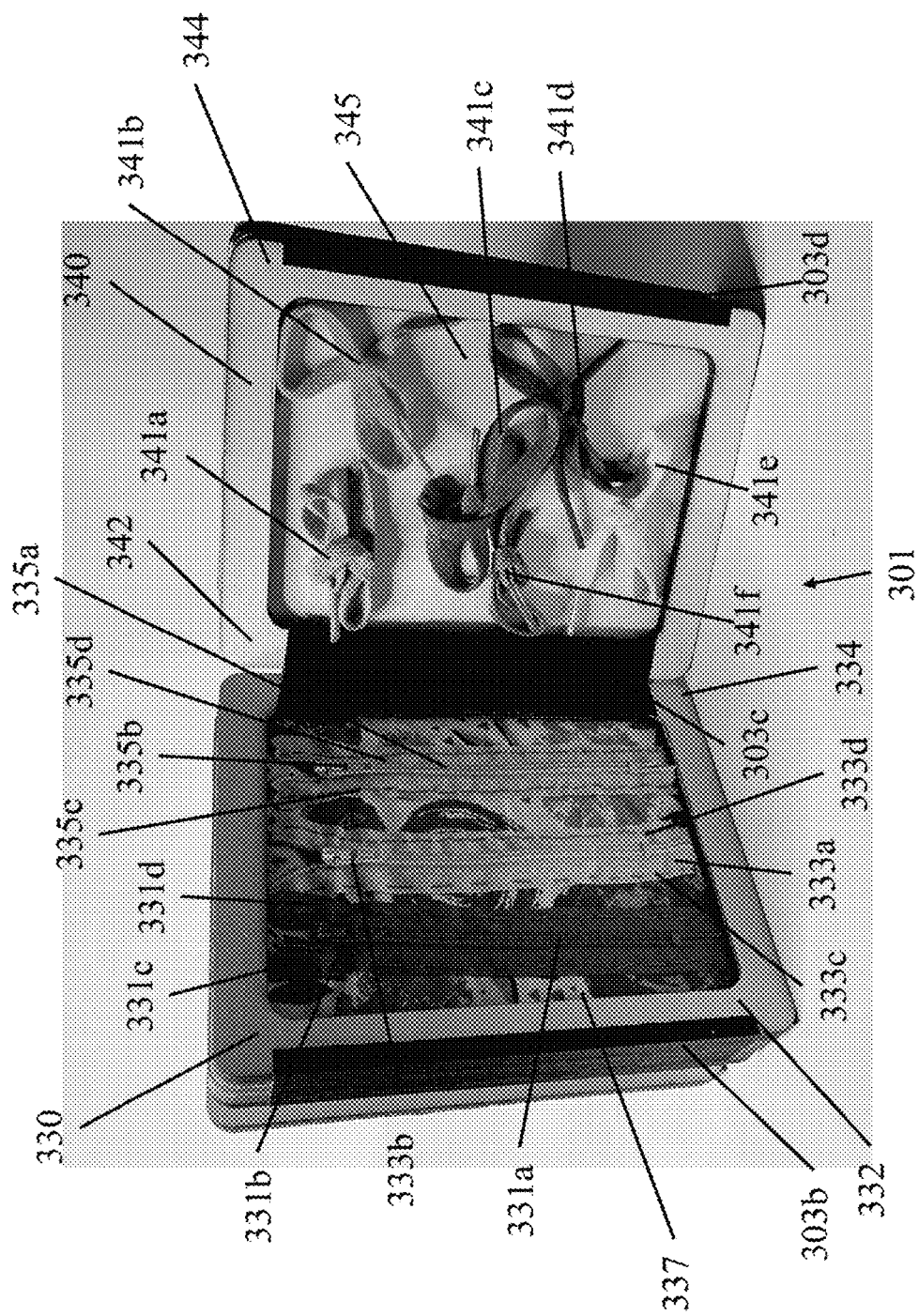
FIG. 3 is a perspective view of a motor skill device's third motor skill panel and fourth motor skill panel, according to some embodiments.

FIG. 3 shows a perspective view of third motor skill panel 330 and fourth motor skill panel 340 according to some embodiments. Third motor skill panel 330 can be coupled to fourth motor skill panel 340 by binding 303c coupled to a second edge 334 of third motor skill panel 330 and a first edge 342 of fourth motor skill panel 340, and to second motor skill panel by binding 303b. In some embodiments, fourth motor skill panel 340 is coupled to third motor skill panel 330 by binding 303c and to fifth motor skill panel by binding 303d.

In some embodiments, third motor skill panel 330 includes a zipping mechanism including one or more zipping elements, such as first zipping element 331a, second zipping element 333a, and third zipping element 335a. First zipping element 331a includes a zipper pull 331b, a first zipping side 331c, and a second zipping side 331d. Second zipping element 333a includes a zipper pull 333b, a first zipping side 333c, and a second zipping side 333d. Third zipping element 335a includes a zipper pull 335b, a first zipping side 335c, and a second zipping side 335d. According to some embodiments, the zipping elements can be configured in any arrangement with more or fewer zipping elements than shown in FIG. 3. For example, zipping elements 331a, 333a, 335a may extend a full dimension of cutout 833b, discussed with reference to FIG. 8, such that zipper pulls 331, 333b, 335b cannot be removed by pulling zipper pulls 331a, 333a, 335a beyond the ends of zipping elements 331a, 333a, 335a. In some embodiments, zipping elements 331a, 333a, 335a can have flared ends to prevent removal of zipper pulls 331, 333b, 335b. Zipping elements 331a, 333a, and 335a can be attached to a fabric 337 that is disposed on the third motor skill panel 330. In some embodiments, the zipping elements 331a, 333a, and 335a are sewn to the fabric 337.

Figure 8:
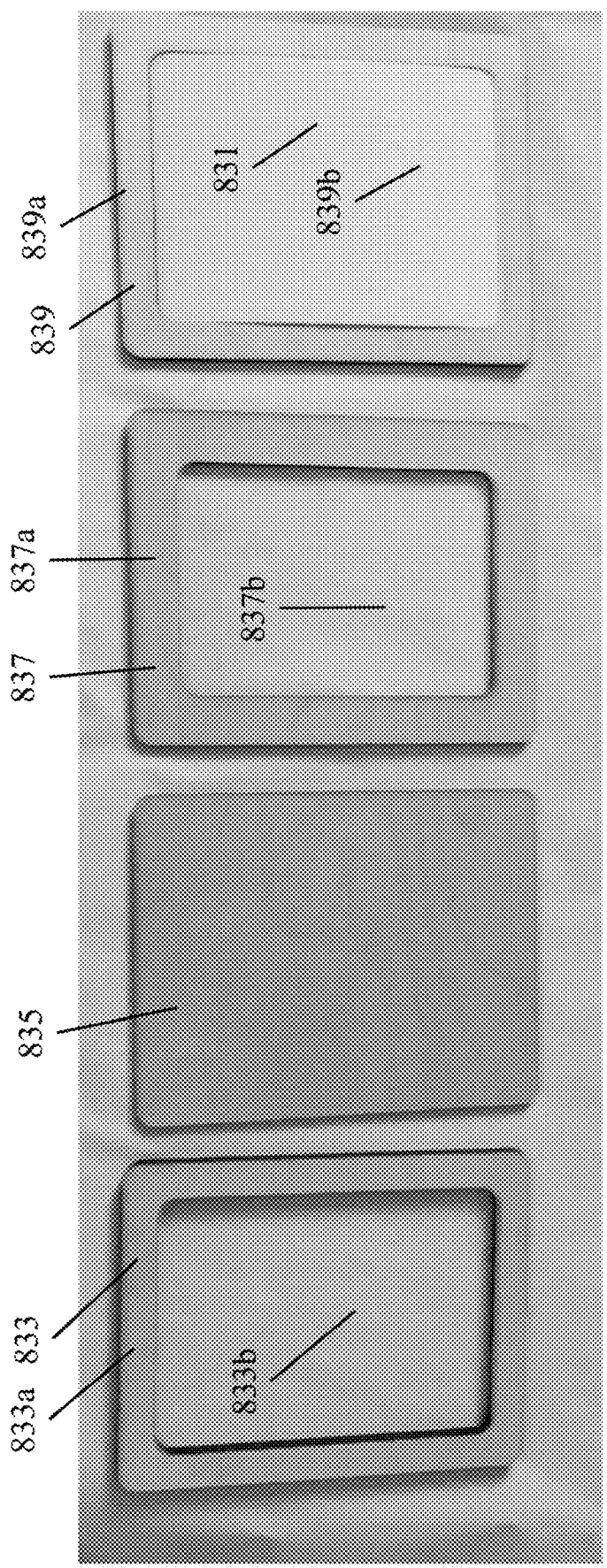
FIG. 8 is a deconstructed view of a motor skill panel for zipping exercises, according to some embodiments.

FIG. 8 shows a perspective view of the frame of third motor skill panel 330 according to some embodiments. The frame of third motor skill panel 330 can include a face layer 833, a mounting layer 835, a spacer layer 837, and a backing layer 839. In some embodiments, each of layer 833, 835, 837, and 839 are stacked and coupled to each adjacent layer. For example, face layer 833 can be a topmost layer, mounting layer 835 can be coupled to and sandwiched between face layer 833 and spacer layer 837, and backing layer 839 can be coupled to spacer layer 837. In some embodiments, layers 833, 835, 837, and 839 can be coupled with an adhesive. In some embodiments, the layers 833, 835, 837, and 839 can be coupled with a fastener, such as a nail or screw. Other suitable couplings are contemplated.

In some embodiments, face layer 833 provides a surface for a user to grasp and can include a border 833a defining a cutout 833b. In some embodiments, the cutout 833b can be the same shape as the outer edge of the border 833a or the cutout 833b can be a different shape from the outer edge of the border 833a. Similarly, spacer layer 837 can include a border 837a and cutout 837b. In some embodiments, backing layer 839 can include a border 839a defining a cutout 839b.

According to some embodiments, the arrangement of face layer 833, mounting layer 835, spacer layer 837, and backing layer 839 is useful to provide a way to dispose zipping elements on the third motor skill panel 330. In some embodiments, a fabric layer, such as fabric 337 shown in FIG. 3, can be coupled to mounting layer 835. For example, adhesive or fasteners can be used to couple fabric 337 to mounting layer 835. In some embodiments, edges of fabric 337 can be sandwiched between face layer 833 and mounting layer 835 to secure fabric 337. In some embodiments, zipping elements 331a, 333a, and 335a can be disposed within a recess formed by cutout 833b to prevent the zipping elements 331a, 333a, and 335a from impeding closure of the third motor skill panel 330 and fourth motor skill panel 340.

In some embodiments, a whiteboard 831, further discussed with reference to FIG. 5, can be disposed in cutout 839b and cutout 837b. Cutout 837 can help reduce weight while maintaining a uniform size for each panel to ensure motor skill panels can lay flat as discussed throughout the present disclosure.

Referring again to FIG. 3, one or more tying elements 341a, 341b, 341c, 341d, 341e, 341f can be disposed on fourth motor skill panel 340 on the third layer 345. The tying elements can be string, shoelace, or any other elongated element suitable for tying, according to some embodiments. According to some embodiments, the tying elements can be configured in any arrangement with more or fewer tying elements than shown in FIG. 3 and/or arranged in various patterns. In some embodiments, each of tying elements 341a, 341b, 341c, 341d, 341e, 341f can include two or more ends that can be tied together. Each end of tying elements 341a, 341b, 341c, 341d, 341e, 341f can have a same or similar color or pattern to signify pairings of ends to form a tying element. In some embodiments, the respective ends of each of tying elements 341a, 341b, 341c, 341d, 341e, 341f are spaced close to each other to signify pairings of ends to form a tying element. In other embodiments, some or all of the ends of tying elements 341a, 341b, 341c, 341d, 341e, 341f are spaced at random (and/or can have different colors and/or patterns) such that there are not distinct pairings of ends to form tying elements.

Figure 9:
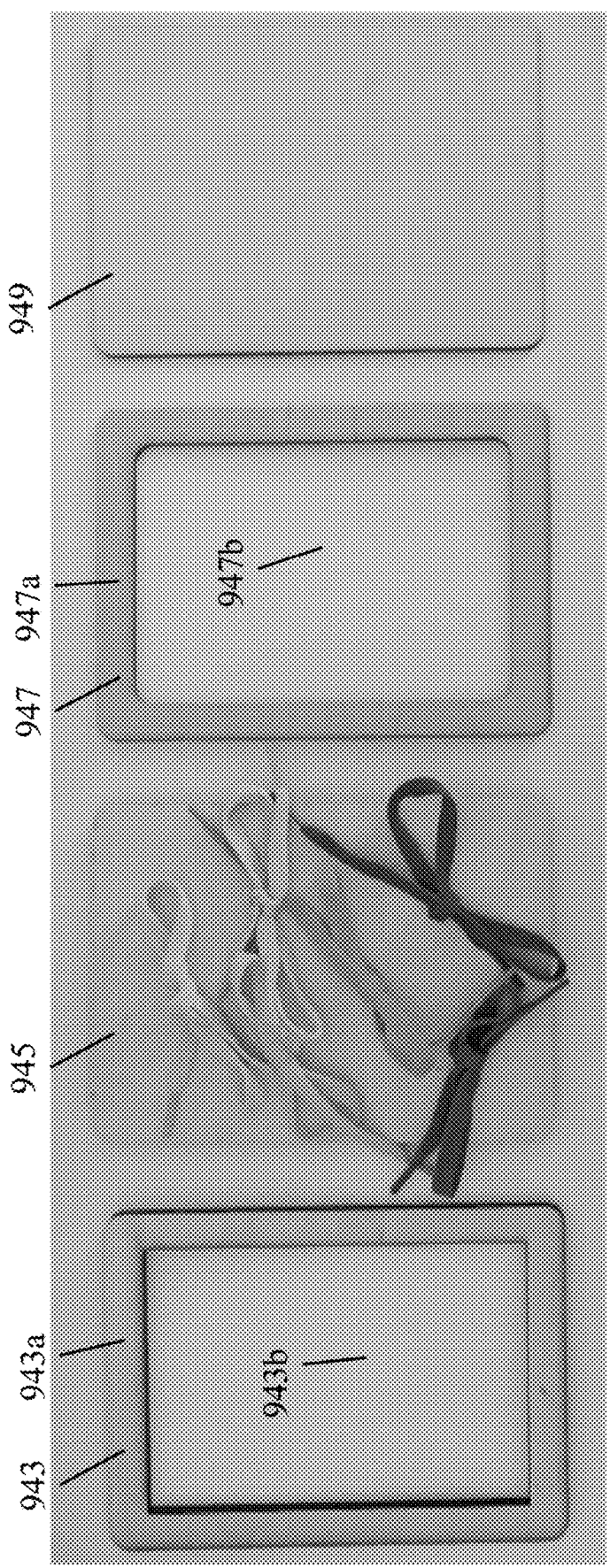
FIG. 9 is a deconstructed view of a motor skill panel for tying exercises, according to some embodiments.

FIG. 9 shows a frame of the fourth motor skill panel 340 according to some embodiments. The frame of fourth motor skill panel 340 can include a face layer 943, a mounting layer 945, a spacer layer 947, and a backing layer 949. In some embodiments, each of layer 943, 945, 947, and 949 are stacked and coupled to each adjacent layer. For example, face layer 943 can be a topmost layer, mounting layer 945 can be coupled to and sandwiched between face layer 943 and spacer layer 947, and backing layer 949 can be coupled to spacer layer 947. In some embodiments, layers 943, 945, 947, and 949 can be coupled with an adhesive. In some embodiments, layers 943, 945, 947, and 949 can be coupled with a fastener, such as a nail or screw. Other suitable couplings are contemplated.

In some embodiments, face layer 943 can provide a border 943a around a cutout 943b. In some embodiments, the cutout 943b can be the same shape as the border 943a or the cutout 943b can be a different shape than the border 943a. In some embodiments, the spacer layer 947 can provide a border 947a around a cutout 947b to reduce weight and provide space for tying elements, such as tying elements 341a, 341b, 341c, 341d, 341e, 341f shown in FIG. 3, behind mounting layer 945. In some embodiments, the cutout 947b can be the same shape as the border 947a or the cutout 947b can be a different shape than the border 947a. In some embodiments, backing layer 949 is a solid piece.

According to some embodiments, the arrangement of face layer 943, mounting layer 945, spacer layer 947, and backing layer 949 facilitates securing of tying elements on fourth motor skill panel 340. For example, tying elements can be coupled to mounting layer 945 and can be disposed in cutout 943b, which allows the tying elements to sit in a recess when third motor skill panel 330 and fourth motor skill panel 340 are adjacent to each other in a closed configuration. In some embodiments, tying elements can be coupled to mounting layer 945 with adhesive or one or more fasteners. In some embodiments, tying elements can be guided through holes in mounting layer 945 such that the free ends of the tying elements are disposed within cutout 943b. In some embodiments, tying elements 341a, 341b, 341c, 341d, 341e, and 341f can be disposed within a recess formed by cutout 943b to prevent the tying elements 341a, 341b, 341c, 341d, 341e, and 341f from impeding closure of the third motor skill panel 330 and fourth motor skill panel 340. Disposing tying elements 341a, 341b, 341c, 341d, 341e, and 341f within a recess formed by cutout 943b can also prevent the tying elements' ends from spill outside of the motor skill device 301 when in a closed configuration.

Figure 4:
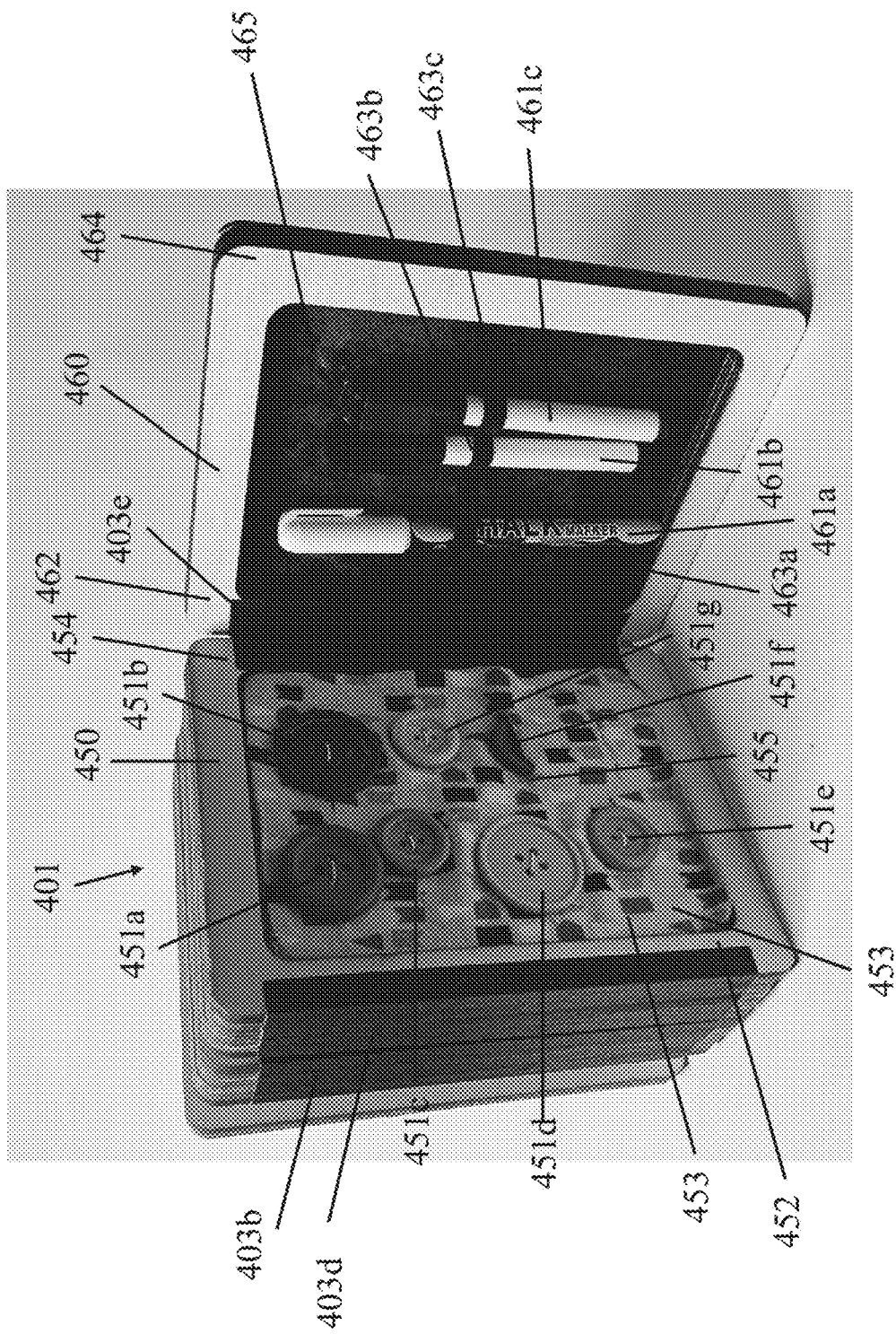
FIG. 4 is a perspective view of a motor skill device's fifth motor skill panel and sixth motor skill panel, according to some embodiments.

FIG. 4 shows a perspective view of fifth motor skill panel 450 and sixth motor skill panel 460 according to some embodiments. The fifth motor skill panel 450 can be coupled to the fourth motor skill panel (not labeled) by the binding 403d via a first edge 452 of fifth motor skill panel 350 and to the sixth motor skill panel 460 by the binding 403e. Fifth motor skill panel 450 is coupled to sixth motor skill panel 460 by the binding 403e coupling a second edge 454 of fifth motor skill panel 450 to a first edge 462 of sixth motor skill panel 460.

In some embodiments, a plurality of buttons 451a, 451b, 451c, 451d, 451e, 451f, and 451g are included on the fifth motor skill panel 450. In some embodiments, the buttons are the same size. In some embodiments, the buttons are different sizes to provide different exercises simulating differently-sized buttons a user may encounter. The buttons can also be arranged in a different configuration on fifth motor skill panel 450 than shown in FIG. 4 according to some embodiments to provide varied exercises for a user. For example, and without limitation, the buttons can be in one or more straight lines, curved lines, in a polygonal shape, or in a circular shape to simulate configurations a user may encounter. A fabric 453 can also be disposed on the fifth motor skill panel 450 in some embodiments. The fabric 453 can have slits 455 through which buttons 451*a*, 451*b*, 451*c*, 451*d*, 451*e*, 451*f*, and 451*g* can be guided, in some embodiments. For example, button 451*f* is shown only partially guided through a slit 455.

Figure 10:
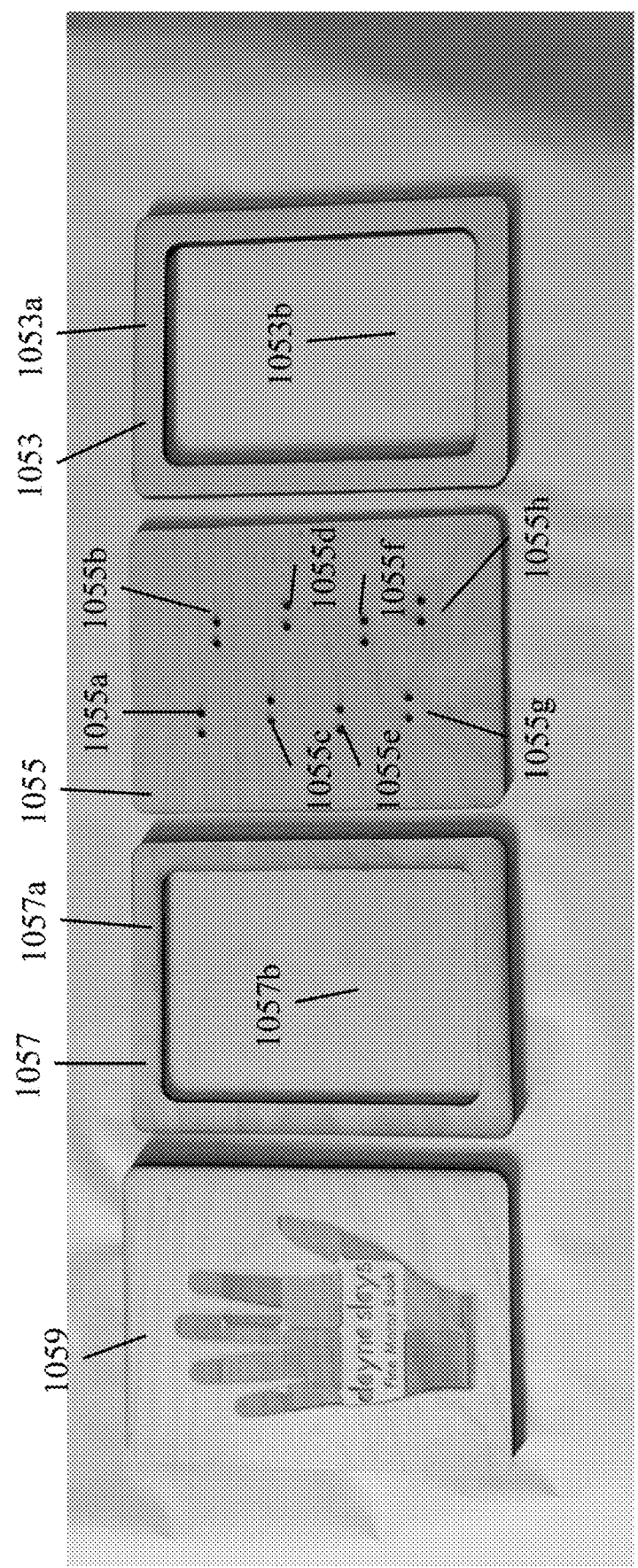
FIG. 10 is a deconstructed view of a motor skill panel for button exercises, according to some embodiments.

FIG. 10 shows a frame of the fifth motor skill panel 1050 according to some embodiments. The frame of fifth motor skill panel 1050 can include a face layer 1053, a mounting layer 1055, a spacer layer 1057, and a backing layer 1059. In some embodiments, each of layer 1053, 1055, 1057, and 1059 are stacked and coupled to each adjacent layer. For example, face layer 1053 can be a topmost layer, mounting layer 1055 can be coupled to and sandwiched between face layer 1053 and spacer layer 1057, and backing layer 1059 can be coupled to spacer layer 1057. In some embodiments, layers 1053, 1055, 1057, and 1059 can be coupled with an adhesive. In some embodiments, layers 1053, 1055, 1057, and 1059 can be coupled with a fastener, such as a nail or screw. Other suitable couplings are contemplated.

In some embodiments, face layer 1053 can provide a border 1053*a* around a cutout 1053*b*. In some embodiments, the cutout 1053*b* can be the same shape as the border 1053*a* or the cutout 1053*b* can be a different shape than the border 1053*a*. In some embodiments, mounting layer 1055 can have pairs of openings 1055*a*-1055*h* to facilitate mounting the buttons 451*a*, 451*b*, 451*c*, 451*d*, 451*e*, 451*f*, and 451*g* to the mounting layer 1055. In some embodiments, a group of openings for a button can contain any number of openings as desired, for example, four openings for a button. According to some embodiments, the pairs of openings 1055*a*-1055*h* can be configured in any arrangement with more or fewer pairs than shown in FIG. 10 and/or arranged in various patterns. In some embodiments, the spacer layer 1057 can provide a border 1057*a* around a recess 1057*b* to reduce weight. In some embodiments, the recess 1057*b* can be the same shape as the border 1057*a* or the recess 1057*b* can be a different shape than the border 1057*a*. In some embodiments, backing layer 1059 is a solid piece.

According to some embodiments, the arrangement of face layer 1053, mounting layer 1055, spacer layer 1057, and backing layer 1059 facilitates mounting buttons 451*a*, 451*b*, 451*c*, 451*d*, 451*e*, 451*f*, and 451*g* on fifth motor skill panel 450. For example, one or more threads can be guided through holes in the buttons 451*a*, 451*b*, 451*c*, 451*d*, 451*e*, 451*f*, and 451*g* and the pairs of openings 1055*a*-*h* and tied. In some embodiments, the one or more threads which secure the buttons 451*a*, 451*b*, 451*c*, 451*d*, 451*e*, 451*f*, and 451*g* are tied and occupy a portion of recess 1057*b* to reduce potential contact that could loosen the threads and cause the buttons 451*a*, 451*b*, 451*c*, 451*d*, 451*e*, 451*f*, and 451*g* to come loose. Further, in some embodiments, recess 1057*b* provides space for the threads which secure buttons 451*a*, 451*b*, 451*c*, 451*d*, 451*e*, 451*f*, and 451*g* such that spacer layer 1057 and mounting layer 1055 can be flush with each other. In some embodiments, the buttons 451*a*, 451*b*, 451*c*, 451*d*, 451*e*, 451*f*, and 451*g* sit in a recess formed by cutout 1053*b* when fifth motor skill panel 450 and sixth motor skill panel 460 are adjacent to each other in a closed configuration to prevent the buttons 451*a*, 451*b*, 451*c*, 451*d*, 451*e*, 451*f*, and 451*g* from obstructing closure of fifth motor skill panel 450 and sixth motor skill panel 460. It should be noted that FIG. 10 shows backing layer 1059 of the fifth motor skill panel as either the front or rear of the motor skill device 401, while FIG. 1 shows fifth motor skill panel 150 between first motor skill panel 110 and sixth motor skill panel 160 which serve as a front and rear of the motor skill device 101. A person of ordinary skill in the art would have understood from the present disclosure that the ordering of the motor skill panels can vary depending on the intended audience.

Referring again to FIG. 4, writing implements 461*a*, 461*b*, 461*c* can be disposed on the sixth motor skill panel 460 in some embodiments. For example, and without limitation, writing implements can be pencils, pens, markers, chalk, or erasers. In some embodiments, writing implements 461*a*, 461*b*, 461*c* can be secured in place by holders 463*a*, 463*b*, 463*c* which are disposed on a recessed panel 465 of the sixth motor skill panel 460 to store the writing implements 461*a*, 461*b*, 461*c* when not in use. In some embodiments, holders 463*a*, 463*b*, 463*c* can be loops, magnets, hook and loop fasteners, buttons, or any other mechanism which can hold the writing implements 461*a*, 461*b*, 461*c* on the sixth motor skill panel 460. FIG. 4 shows that holders 463*a*, 463*b*, 463*c* can be loops of elastic material according to some embodiments.

Figure 11:
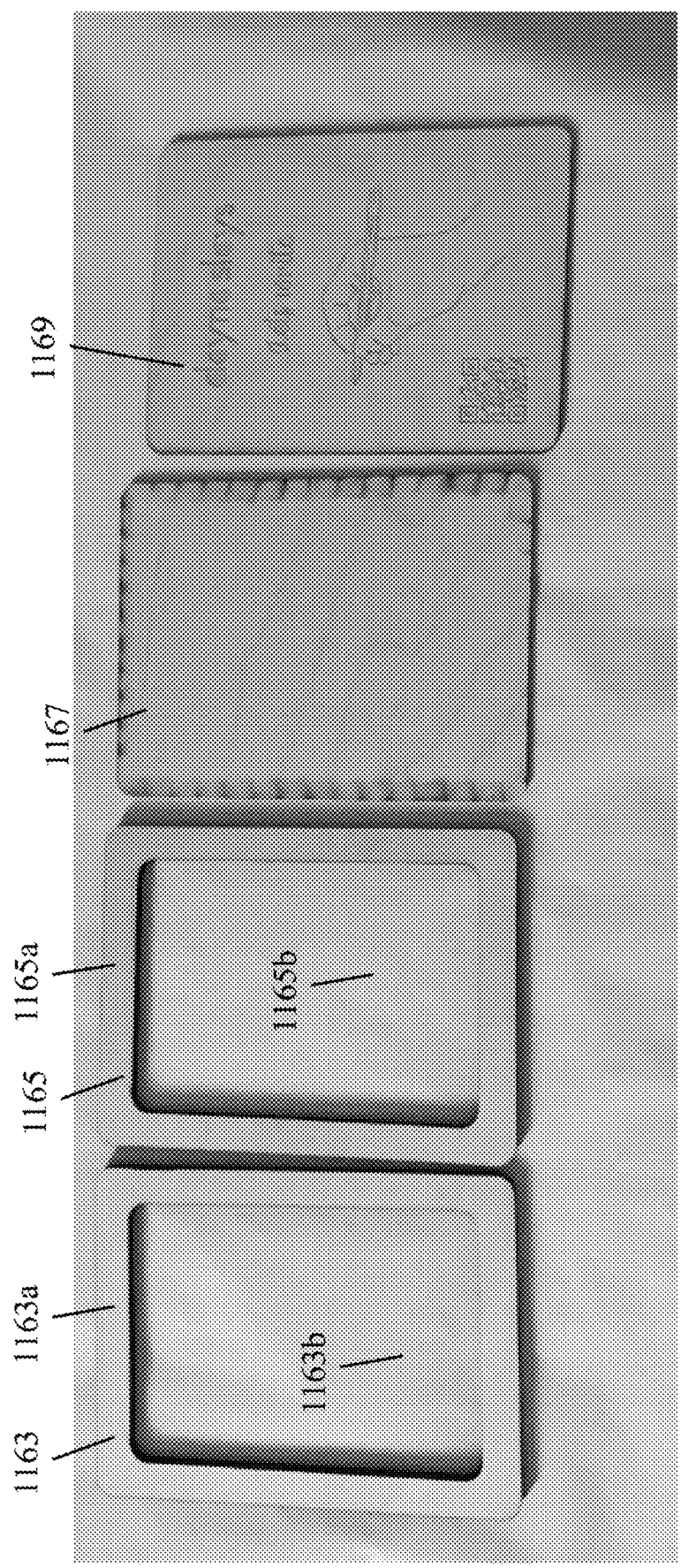
FIG. 11 is a deconstructed view of a motor skill panel for storing writing implements, according to some embodiments.

FIG. 11 shows a frame of the sixth motor skill panel 460 according to some embodiments. The frame of sixth motor skill panel 460 can include a face layer 1163, a spacer layer 1165, a mounting layer 1167, and a backing layer 1169. According to some embodiments, manufacturing of the motor skill device 401 can be simplified by using similar pieces for face layer 1163 and space layer 1165 rather than creating one thick layer. In some embodiments, each of layer 1163, 1165, 1167, and 1169 are stacked and coupled to each adjacent layer. For example, face layer 1163 can be a topmost layer, spacer layer 1165 can be coupled to and sandwiched between face layer 1163 and mounting layer 1167, and backing layer 1169 can be coupled to mounting layer 1167. In some embodiments, layers 1163, 1165, 1167, and 1169 can be coupled with an adhesive. In some embodiments, layers 1163, 1165, 1167, and 1169 can be coupled with a fastener, such as a nail or screw. Other suitable couplings are contemplated.

In some embodiments, face layer 1163 and spacer layer 1165 can provide a border 1163*a*, 1165*a* around a cutout 1163*b*, 1165*b* respectively. In some embodiments, the cutout 1053*b* can be the same shape as the border 1053*a* or the cutout 1053*b* can be a different shape than the border 1053*a*. In some embodiments, backing layer 1059 is a solid piece.

According to some embodiments, the arrangement of face layer 1163, spacer layer 1165, mounting layer 1167, and backing layer 1169 is useful to provide a way to dispose the writing implements on sixth motor skill panel 460. For example, the holders 463*a*, 463*b*, and 463*c* can be disposed on the mounting layer 1167 such that, in some embodiments, the writing implements sit in a recess formed by cutouts 1163*b*, 1165*b* when fifth motor skill panel 450 and sixth motor skill panel 460 are adjacent to each other in a closed configuration. Such configuration enables fifth motor skill panel 450 and sixth motor skill panel 460 to sit flat in a closed configuration.

As described with reference to FIGS. 6-11, the frames of motor skill panels can be assembled in layers, in some embodiments, to provide the benefits of making manufacturing the motor skill panels easier. Making individual layers for the frames of motor skill panels can be simpler than cutting into a solid block of material, in some embodiments, and can provide better control over particular depths and dimensions of the motor skill panels.

Figure 5:
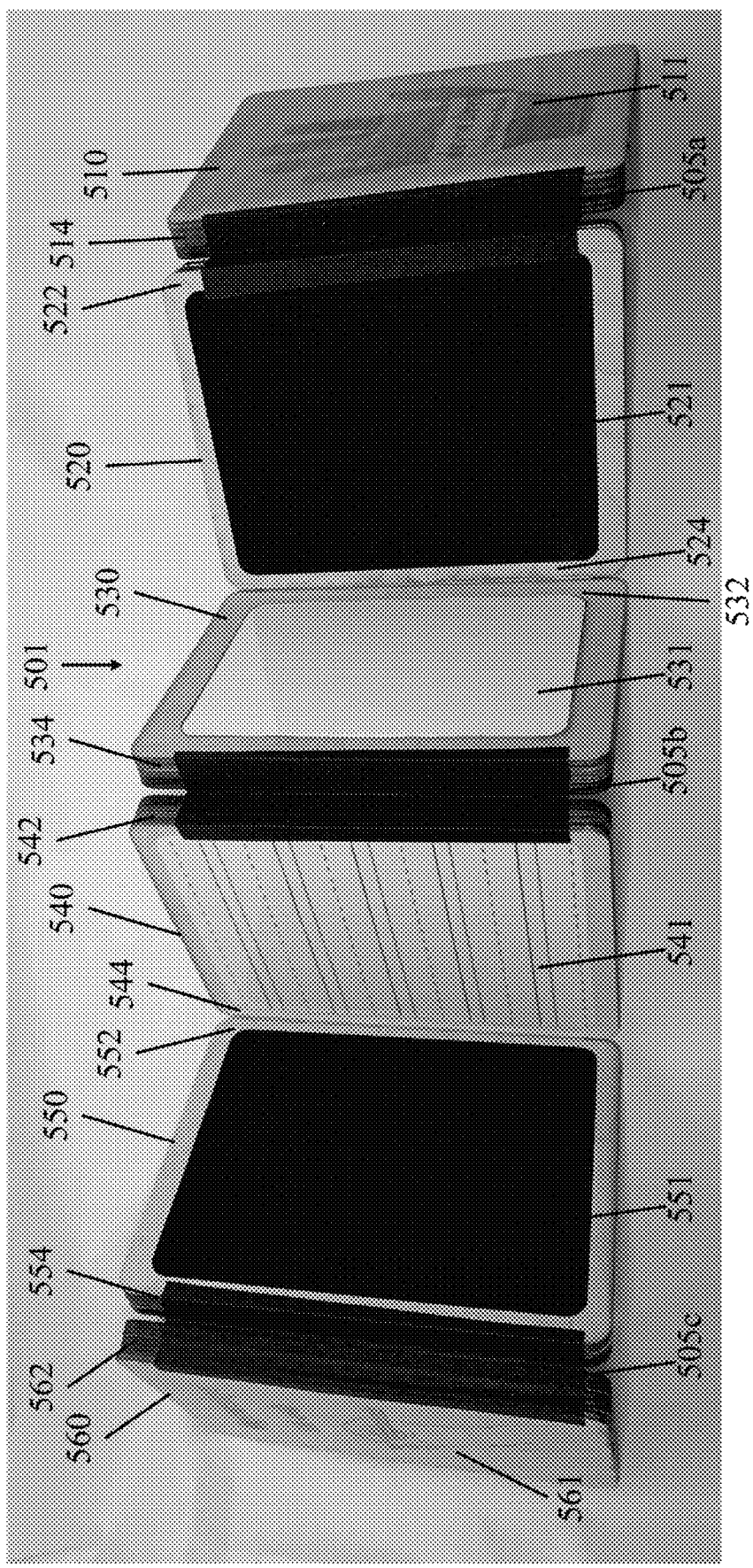
FIG. 5 is a perspective view showing the rear side of a motor skill device, according to some embodiments.

FIG. 5 shows a perspective view of the back side of training device 501, including a view of the back side of each of motor skill panels 510, 520, 530, 540, 550, 560, according to some embodiments. In some embodiments, bindings 505a, 505b, 505c couple subsets of the motor skill panels to permit the motor skill device 501 to open in an accordion-like manner and closing into a compact configuration as discussed throughout the present disclosure. For example, binding 505a couples the first motor skill panel 510 and the second motor skill panel 520 via the second edge 514 of the first motor skill panel 510 and first edge 522 of the second motor skill panel 520, binding 505b couples the third motor skill panel 530 and the fourth motor skill panel 540 via the second edge 534 of the third motor skill panel 530 and first edge 532 of the fourth motor skill panel, and binding 505c couples the fifth motor skill panel 550 and the sixth motor skill panel 560 via the second edge 554 of the fifth motor skill panel 550 and the first edge 562 of the sixth motor skill panel. In some embodiments, the bindings 505a, 505b, and 505c are adhesive strips. However, according to some embodiments, the bindings 505a, 505b, 505c can be string, rings, or any other structure for coupling the plurality of panels and other binding arrangements are possible.

Figure 12:
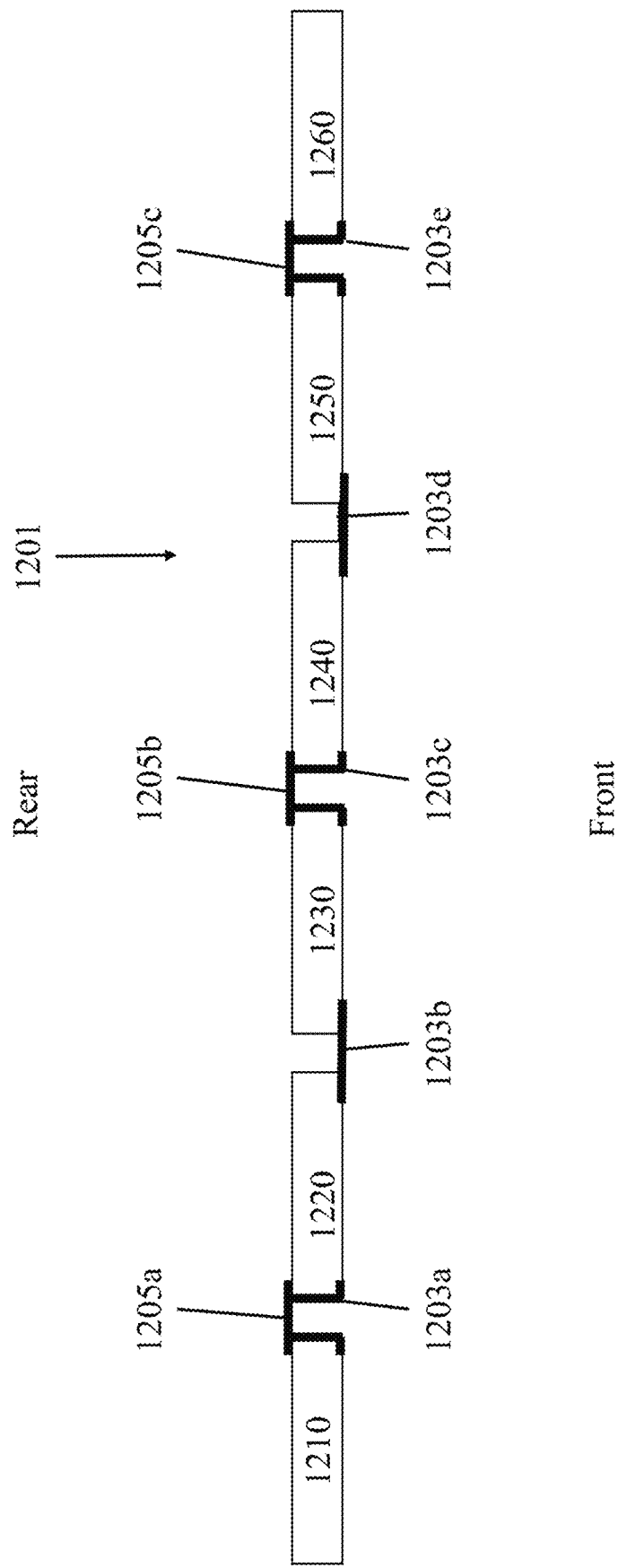
FIG. 12 is a top-down illustration of a motor skill device, according to some embodiments.

FIG. 12 illustrates a top-down view of the motor skill device 1201 according to some embodiments. Bindings 1203a-e can couple each of motor skill panels 1210, 1220, 1230, 1240, 1250, 1260 on the front side of the motor skill device 1201 in some embodiments. In some embodiments, the rear side of the motor skill panels 1210, 1220, 1230, 1240, 1250, 1260 can be coupled such that binding 1205a couples the first motor skill panel 1210 and the second motor skill panel 1220, binding 1205b couples the third motor skill panel 1230 and the fourth motor skill panel 1240, and binding 1205c couples the fifth motor skill panel 1250 and the sixth motor skill panel 1260. In some embodiments, binding 1203a, 1203c, and 1204e are closer to the front side of the motor skill device 1201 such that bindings 1203a, 1203, and 1204e wrap around the edges of the motor skill panels as illustrated in FIG. 12. As explained throughout this disclosure, this binding technique facilitates the accordion-like opening and closing manner of the motor skill device 1201.

Referring again to FIG. 5, mechanisms having a generally flat form can be disposed on the rear side of some or each of the motor skill panels, according to some embodiments. The flat form of such mechanisms can be useful for allowing the motor skill device 501 to lay flat in an open configuration and to be compact in a closed configuration.

In some embodiments, for example, mechanisms having a generally flat form can be attachable to or removable from the rear side of some or each of the motor skill panels 510, 520, 530, 540, 550, 560. In some embodiments, the mechanisms having a generally flat form are not detachable from the rear side of some or each of the motor skill panels 510, 520, 530, 540, 550, 560. In some embodiments, the mechanisms having a generally flat form provide a surface for a user to draw or write on. For example, mechanisms having a generally flat form can be marking surfaces 521 and 551 which can be a chalkboard surface attached to the rear of second motor skill panel 520 and fifth motor skill panel 550 respectively. In some embodiments, an adhesive can be used to affix the marking surfaces 521 and 551 to the rear of first motor skill panel 520 and fifth motor skill panel 550, respectively. In some embodiments, marking surfaces 531 and 541 can be dry-erase marker boards which are coupled to the third motor skill panel 530 and fourth motor skill panel 540, respectively. In some embodiments, marking surfaces 531 and 541 are disposed in a recessed cutout in the rear of third motor skill panel 530 and fourth motor skill panel 540 respectively. According to some embodiments, the marking surfaces can be configured on the rear of the motor skill panels in any order and/or on more or fewer motor skill panels than shown in FIG. 5. In some embodiments, the placement of marking surfaces on the rear of the motor skill panels can increase the number of mechanisms for a user to interact with compared to if mechanisms were only present on the front side of the motor skill panels.

A user of the motor skill device 501 can write on the marking surfaces 521, 531, 541, 551 with one or more of the writing implements 461a, 461b, 461c, which can be stored in recessed panel 465 as discussed, for example, with reference to FIG. 4.

In some embodiments, indicia 511, 561 can be etched into the rear of first motor skill panel 511 and sixth motor skill panel 561, respectively. Such indicia 511, 561 can include a QR code that can direct a user to further information regarding the motor skill device 501, including instructions about how to use the motor skill device 501 or fine motor functioning in general. Such indicia can be laser-etched into the rear of one or more of the panels 510, 520, 530, 540, 550, 560, or affixed, marked, or otherwise disposed on the read using any other suitable technique.

As discussed throughout the present disclosure, the motor skill device can be used to train a user's fine motor skills by providing a device enabling repetitive practice of fine motor skills. In some embodiments, the user has more opportunities to practice their fine motor skills because a user can easily carry and use the motor skill device with them due to its compact or portable nature. The ability for the motor skill device to lay flat with all panels easily accessible enables the user to interact with multiple mechanisms at once or in quick succession in some embodiments. In addition to training fine motor skills, the motor skill device can be used as a benchmarking tool in some embodiments. For example, a user of particular age may be expected to be able to interact with the various mechanisms discussed throughout the disclosure in particular ways, such as with a certain speed or quality. In some embodiments, delays in fine motor skills can be identified if the user is unable to interact with the motor skill device as expected.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, can readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter can be made without departing from the spirit and scope of the disclosed subject matter, which is limited only by the claims which follow.

The invention claimed is:

1. A motor skill activity book for individuals having poor fine motor skills which can be configured to be laid flat in an elongated fashion and to be closed into a compact rectangular prismatic form comprising:
　a plurality of panels comprising a first panel, a second panel, a third panel, and a fourth panel, each of the plurality of panels comprising a face layer defining a cutout section, a backing layer, and at least one intermediate layer stacked between the face layer and the backing layer wherein:
　　a front face of the face layer forms at least a portion of a front face of the panel,
　　a rear face of the backing layer forms at least a portion of a rear face of the panel located opposite the front face of the panel,
　　a first coupling edge comprising at least one edge of the face layer, the at least one intermediate layer, and the backing layer,
　　a second coupling edge located opposite the first coupling edge comprising at least one edge of the face layer, the at least one intermediate layer, or the backing layer, and
　　the at least one intermediate layer of one of the plurality of panels comprises a first intermediate layer and a second intermediate layer, the first intermediate layer and the second intermediate layer defining a cutout section, the first intermediate layer further having at least one notch in a periphery of the first intermediate layer;
　at least one motor skill mechanism for stimulating an individual's fine motor skills on the front face of each of the plurality of panels, the at least one motor skill mechanism positioned at least partially within a cavity defined by the cutout section of the face layer of each of the plurality of panels;
　the at least one of the motor skill mechanisms comprises a tension exercise on the one of the plurality of panels, the tension exercise comprising:
　　at least one tension band mounted to the at least one notch in the periphery of the first intermediate layer, the at least one tension band stretching across the cutout section of the first intermediate layer and the cutout section of the second intermediate layer;
　at least one erasable board disposed on at least one rear face of the plurality of panels;
　front bindings located on front faces of the plurality of panels, the front bindings coupling the second coupling edge of the first panel to the first coupling edge of the second panel, the second coupling edge of the second panel to the first coupling edge of the third panel, and the second coupling edge of the third panel to the first coupling edge of the fourth panel; and
　rear bindings located on rear faces of the plurality of panels, the rear bindings coupling the second coupling edge of the first panel to the first coupling edge of the second panel, and the second coupling edge of the third panel to the first coupling edge of the fourth panel, such that the motor skill activity book can be configured between an open state in which the plurality of panels can lay flat such that the front face of each of the plurality of panels is substantially flush with the front faces of the other of the plurality panels, and a closed state in which the plurality of panels stack on top of each other.

2. The motor skill activity book of claim 1, wherein at least one of the motor skill mechanisms comprises a zip exercise on one of the plurality of panels, the zip exercise comprising:
　a fabric attached to the at least one intermediate layer; and
　at least one zipper attached to the fabric.

3. The motor skill activity book of claim 1, wherein at least one of the motor skill mechanisms comprises a tie exercise on one of the plurality of panels, the tie exercise comprising:
　at least one string attached to the at least one intermediate layer, the at least one string having ends located on the front face of the one of the plurality of panels.

4. The motor skill activity book of claim 1, wherein at least one of the motor skill mechanisms comprises a button exercise on one of the plurality of panels, the button exercise comprising:
　a fabric attached to the at least one intermediate layer; and
　at least one button disposed on the at least one intermediate layer, the at least one button located over a slit in the fabric and substantially flush with the front face of the one of the plurality of panels.

5. The motor skill activity book of claim 1, wherein at least one of the plurality of panels has a QR code etched into the rear face of the backing layer.

6. The motor skill activity book of claim 1, wherein at least one of the motor skill mechanisms comprises a squeeze exercise on one of the plurality of panels, the squeeze exercise comprising:
　a pouch having edges disposed between a first intermediate layer of the at least one intermediate layer on the one of the plurality of panels and a second intermediate layer of the at least one intermediate layer on the one of the plurality of panels, wherein the first intermediate layer and the second intermediate layer further define a cutout section; and
　a malleable substance enclosed by the pouch, edges of the cutout sections of the first intermediate layer and the second intermediate layer, and the backing layer of the one of the plurality of panels, wherein the malleable substance can lay substantially flush with the front face of the panel when the malleable substance is compressed such that the motor skill activity book can lay substantially flat on a surface when the front face of the panel is facing the surface.

7. The motor skill activity book of claim 1, wherein at least one of the motor skill mechanisms comprises a writing implement holder on one of the plurality of panels, the writing implement holder comprising:
　at least one elastic loop on the at least one intermediate layer that can hold a writing implement substantially flush with the front face of the one of the plurality of panels such that the motor skill activity book can lay substantially flat on a surface when the front face of the one of the plurality of panel is facing the surface.

8. A motor skill activity book for individuals having poor fine motor skills which can be configured to be laid flat in an elongated fashion and to be closed into a compact rectangular prismatic form comprising:
　a plurality of panels comprising a first panel, a second panel, a third panel, and a fourth panel, each of the plurality of panels comprising a face layer defining a cutout section, a backing layer, and at least one intermediate layer stacked between the face layer and the backing layer wherein:
  a front face of the face layer forms at least a portion of a front face of the panel,
  a rear face of the backing layer forms at least a portion of a rear face of the panel located opposite the front face of the panel,
  a first coupling edge comprising at least one edge of the face layer, the at least one intermediate layer, and the backing layer, and
  a second coupling edge located opposite the first coupling edge comprising at least one edge of the face layer, the at least one intermediate layer, or the backing layer;
at least one motor skill mechanism for stimulating an individual's fine motor skills on the front face of each of the plurality of panels, the at least one motor skill mechanism positioned at least partially within a cavity defined by the cutout section of the face layer of each of the plurality of panels;
the at least one of the motor skill mechanisms comprises a squeeze exercise on one of the plurality of panels, the squeeze exercise comprising:
  a pouch having edges disposed between a first intermediate layer of the at least one intermediate layer on the one of the plurality of panels and a second intermediate layer of the at least one intermediate layer on the one of the plurality of panels, wherein the first intermediate layer and the second intermediate layer further define a cutout section, and
  a malleable substance enclosed by the pouch, edges of the cutout sections of the first intermediate layer and the second intermediate layer, and the backing layer of the one of the plurality of panels, wherein the malleable substance can lay substantially flush with the front face of the panel when the malleable substance is compressed such that the motor skill activity book can lay substantially flat on a surface when the front face of the panel is facing the surface;
at least one erasable board disposed on at least one rear face of the plurality of panels;
front bindings located on front faces of the plurality of panels, the front bindings coupling the second coupling edge of the first panel to the first coupling edge of the second panel, the second coupling edge of the second panel to the first coupling edge of the third panel, and the second coupling edge of the third panel to the first coupling edge of the fourth panel; and
rear bindings located on rear faces of the plurality of panels, the rear bindings coupling the second coupling edge of the first panel to the first coupling edge of the second panel, and the second coupling edge of the third panel to the first coupling edge of the fourth panel, such that the motor skill activity book can be configured between an open state in which the plurality of panels can lay flat such that the front face of each of the plurality of panels is substantially flush with the front faces of the other of the plurality panels, and a closed state in which the plurality of panels stack on top of each other.

9. The motor skill activity book of claim 8, wherein at least one of the motor skill mechanisms comprises a zip exercise on one of the plurality of panels, the zip exercise comprising:
  a fabric attached to the at least one intermediate layer; and
  at least one zipper attached to the fabric.

10. The motor skill activity book of claim 8, wherein at least one of the motor skill mechanisms comprises a tie exercise on one of the plurality of panels, the tie exercise comprising:
  at least one string attached to the at least one intermediate layer, the at least one string having ends located on the front face of the one of the plurality of panels.

11. The motor skill activity book of claim 8, wherein at least one of the motor skill mechanisms comprises a button exercise on one of the plurality of panels, the button exercise comprising:
  a fabric attached to the at least one intermediate layer; and
  at least one button disposed on the at least one intermediate layer, the at least one button located over a slit in the fabric and substantially flush with the front face of the one of the plurality of panels.

12. The motor skill activity book of claim 8, wherein at least one of the plurality of panels has a QR code etched into the rear face of the backing layer.

13. The motor skill activity book of claim 8, wherein:
  the at least one intermediate layer of one of the plurality of panels comprises a first intermediate layer and a second intermediate layer, the first intermediate layer and the second intermediate layer defining a cutout section, the first intermediate layer further having at least one notch in a periphery of the first intermediate layer; and
  the at least one of the motor skill mechanisms comprises a tension exercise on the one of the plurality of panels, the tension exercise comprising:
    at least one tension band mounted to the at least one notch in the periphery of the first intermediate layer, the at least one tension band stretching across the cutout section of the first intermediate layer and the cutout section of the second intermediate layer.

14. The motor skill activity book of claim 8, wherein at least one of the motor skill mechanisms comprises a writing implement holder on one of the plurality of panels, the writing implement holder comprising:
  at least one elastic loop on the at least one intermediate layer that can hold a writing implement substantially flush with the front face of the one of the plurality of panels such that the motor skill activity book can lay substantially flat on a surface when the front face of the one of the plurality of panel is facing the surface.

15. A motor skill activity book for individuals having poor fine motor skills which can be configured to be laid flat in an elongated fashion and to be closed into a compact rectangular prismatic form comprising:
  a plurality of panels comprising a first panel, a second panel, a third panel, and a fourth panel, each of the plurality of panels comprising a face layer defining a cutout section, a backing layer, and at least one intermediate layer stacked between the face layer and the backing layer wherein:
    a front face of the face layer forms at least a portion of a front face of the panel,
    a rear face of the backing layer forms at least a portion of a rear face of the panel located opposite the front face of the panel, a first coupling edge comprising at least one edge of the face layer, the at least one intermediate layer, and the backing layer, and a second coupling edge located opposite the first coupling edge comprising at least one edge of the face layer, the at least one intermediate layer, or the backing layer;

at least one motor skill mechanism for stimulating an individual's fine motor skills on the front face of each of the plurality of panels, the at least one motor skill mechanism positioned at least partially within a cavity defined by the cutout section of the face layer of each of the plurality of panels;

the at least one of the motor skill mechanisms comprises a writing implement holder on one of the plurality of panels, the writing implement holder comprising:

at least one elastic loop on the at least one intermediate layer that can hold a writing implement substantially flush with the front face of the one of the plurality of panels such that the motor skill activity book can lay substantially flat on a surface when the front face of the one of the plurality of panel is facing the surface;

at least one erasable board disposed on at least one rear face of the plurality of panels;

front bindings located on front faces of the plurality of panels, the front bindings coupling the second coupling edge of the first panel to the first coupling edge of the second panel, the second coupling edge of the second panel to the first coupling edge of the third panel, and the second coupling edge of the third panel to the first coupling edge of the fourth panel; and rear bindings located on rear faces of the plurality of panels, the rear bindings coupling the second coupling edge of the first panel to the first coupling edge of the second panel, and the second coupling edge of the third panel to the first coupling edge of the fourth panel, such that the motor skill activity book can be configured between an open state in which the plurality of panels can lay flat such that the front face of each of the plurality of panels is substantially flush with the front faces of the other of the plurality panels, and a closed state in which the plurality of panels stack on top of each other.

16. The motor skill activity book of claim 15, wherein at least one of the motor skill mechanisms comprises a zip exercise on one of the plurality of panels, the zip exercise comprising:

a fabric attached to the at least one intermediate layer; and
at least one zipper attached to the fabric.

17. The motor skill activity book of claim 15, wherein at least one of the motor skill mechanisms comprises a tie exercise on one of the plurality of panels, the tie exercise comprising:

at least one string attached to the at least one intermediate layer, the at least one string having ends located on the front face of the one of the plurality of panels.

18. The motor skill activity book of claim 15, wherein at least one of the motor skill mechanisms comprises a button exercise on one of the plurality of panels, the button exercise comprising:

a fabric attached to the at least one intermediate layer; and
at least one button disposed on the at least one intermediate layer, the at least one button located over a slit in the fabric and substantially flush with the front face of the one of the plurality of panels.

19. The motor skill activity book of claim 15, wherein at least one of the plurality of panels has a QR code etched into the rear face of the backing layer.

20. The motor skill activity book of claim 15, wherein:

at least one of the motor skill mechanisms comprises a squeeze exercise on one of the plurality of panels, the squeeze exercise comprising:

a pouch having edges disposed between a first intermediate layer of the at least one intermediate layer on the one of the plurality of panels and a second intermediate layer of the at least one intermediate layer on the one of the plurality of panels, wherein the first intermediate layer and the second intermediate layer further define a cutout section, and a malleable substance enclosed by the pouch, edges of the cutout sections of the first intermediate layer and the second intermediate layer, and the backing layer of the one of the plurality of panels, wherein the malleable substance can lay substantially flush with the front face of the panel when the malleable substance is compressed such that the motor skill activity book can lay substantially flat on a surface when the front face of the panel is facing the surface;

the at least one intermediate layer of one of the plurality of panels comprises a first intermediate layer and a second intermediate layer, the first intermediate layer and the second intermediate layer defining a cutout section, the first intermediate layer further having at least one notch in a periphery of the first intermediate layer; and the at least one of the motor skill mechanisms comprises a tension exercise on the one of the plurality of panels, the tension exercise comprising:

at least one tension band mounted to the at least one notch in the periphery of the first intermediate layer, the at least one tension band stretching across the cutout section of the first intermediate layer and the cutout section of the second intermediate layer.

* * * * *